(12) United States Patent
McAuliffe et al.

(10) Patent No.: US 10,808,862 B2
(45) Date of Patent: Oct. 20, 2020

(54) SELF-ACTING PRESSURE DRAIN VALVE

(71) Applicant: Hamilton Sundstrand Corporation, Windsor Locks, CT (US)

(72) Inventors: Christopher McAuliffe, Windsor, CT (US); Nigel Palmer, West Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 27 days.

(21) Appl. No.: 15/899,318

(22) Filed: Feb. 19, 2018

(65) Prior Publication Data

US 2018/0172179 A1 Jun. 21, 2018

Related U.S. Application Data

(62) Division of application No. 14/612,525, filed on Feb. 3, 2015, now Pat. No. 9,897,227.

(51) Int. Cl.
| | |
|---|---|
| *F16K 15/00* | (2006.01) |
| *F16K 31/126* | (2006.01) |
| *F16K 7/00* | (2006.01) |
| *F16K 21/00* | (2006.01) |
| *F16K 15/14* | (2006.01) |
| *F16K 15/16* | (2006.01) |
| *F16K 17/28* | (2006.01) |

(52) U.S. Cl.
CPC ............ *F16K 31/1266* (2013.01); *F16K 7/00* (2013.01); *F16K 15/144* (2013.01); *F16K 15/16* (2013.01); *F16K 17/28* (2013.01); *F16K 21/00* (2013.01); *Y10T 137/7869* (2015.04); *Y10T 137/7895* (2015.04)

(58) Field of Classification Search
CPC ......... Y10T 137/7869; Y10T 137/7891; Y10T 137/7888; Y10T 137/7895
See application file for complete search history.

(56) References Cited

U.S. PATENT DOCUMENTS

| | | | | |
|---|---|---|---|---|
| 2,512,694 | A * | 6/1950 | Stout et al. ............. | F16K 15/00 137/107 |
| 2,926,686 | A * | 3/1960 | Gheen ..................... | E03C 1/108 137/217 |
| 2,946,342 | A * | 7/1960 | Dopplmaier .............. | E03C 1/10 137/217 |

(Continued)

OTHER PUBLICATIONS

Office Action for Chinese Application No. 201610076270.X, Application filing date Feb. 3, 2016; dated Jul. 11, 2018 (15 pages).

*Primary Examiner* — Robert K Arundale
(74) *Attorney, Agent, or Firm* — Cantor Colburn LLP (57) ABSTRACT

A self-acting pressure activated drain valve includes at least one inlet configured to receive a fluid. A drainage passage delivers the fluid to at least one outlet where the fluid is expelled. The self-acting pressure activated drain valve further includes a flexible diaphragm configured to operate in an open position and a closed position based on a pressure. The flexible diaphragm is normally biased in the open position such that fluid is delivered from the at least one inlet to the at least one outlet via the drainage passage. The pressure, however, initiates the closed position such that air is prevented from flowing through the drainage passage.

7 Claims, 9 Drawing Sheets

(56) References Cited

U.S. PATENT DOCUMENTS

| | | | | |
|---|---|---|---|---|
| 3,380,474 A | * | 4/1968 | Mills | F16K 15/144 |
| | | | | 137/517 |
| 5,199,455 A | * | 4/1993 | Dlouhy | D06F 39/08 |
| | | | | 137/216 |
| 2008/0011667 A1 | | 1/2008 | Ruschke | |
| 2014/0261786 A1 | * | 9/2014 | Burau | A62C 3/08 |
| | | | | 137/505 |

\* cited by examiner

SELF-ACTING PRESSURE DRAIN VALVE

DOMESTIC PRIORITY

This application is a divisional application of U.S. patent application Ser. No. 14/612,525, filed on Feb. 3, 2015, the disclosure of which is incorporated by reference herein in its entirety.

TECHNICAL FIELD

The present invention relates generally to fluid drainage valves, and more particularly, to a self-acting pressure activated drain valve.

BACKGROUND

Vehicles, such as commercial airline vehicles for example, include environmental control systems (ECSs) that operate to control pressure and environmental conditions for improving comfort of the passengers and crew. When ECSs are switched off and exposed to cool and humid ambient air conditions, the temperature differential between the ECS and the ambient air can cause water condensation, which after a period of time results in the accumulation of water (i.e., water pooling) at one or more locations of the ECS.

Conventional methods for preventing water pooling consist of drilling holes at various locations of the ECS where water typically accumulates. Although the drilled holes allow water to drain, the holes remain open at all times regardless as to whether the ECS is operating or switched off. Consequently, the drilled holes remain open during operation of the ECS which results in flow loss through the ECS. Consequently, the overall efficiency of the ECS is reduced while also causing an undesirable increase in fuel consumption of the aircraft. To reduce the flow loss, the drilled holes are typically sized as small as possible. When the drill holes are sized too small, however, debris (e.g., dust, dirt, etc.) can clog the holes and prevent water from properly draining from the ECS.

SUMMARY

According to a non-limiting embodiment, a self-acting pressure activated drain valve includes at least one inlet configured to receive a fluid. A drainage passage delivers the fluid to at least one outlet where the fluid is expelled. The self-acting pressure activated drain valve further includes a flexible diaphragm configured to operate in an open position and a closed position based only on a pressure. The flexible diaphragm is normally biased in the open position such that fluid is delivered from the at least one inlet to the at least one outlet via the drainage passage. The pressure, however, initiates the closed position such that air is prevented from flowing through the drainage passage.

According to another non-limiting embodiment, a method of draining fluid using a self-acting pressure activated drain valve comprises disposing a flexible diaphragm above a drainage passage, and interposing at least one inlet of the self-acting pressure activated drain valve between a flow path of the fluid and the drainage passage. The method includes biasing the flexible diaphragm in an open position when a first pressure surrounding the self-acting pressure activated drain valve is less than or equal to a second pressure within the drainage passage such that the fluid is delivered through the drainage passage. The method further includes collapsing the flexible diaphragm into a closed position that seals the first opening in response to the first pressure being greater than the second pressure.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Various non-limiting embodiments of the invention provide a self-acting pressure drainage valve that requires no active control or input from a microcontroller and/or individual actuator. The self-acting pressure drainage valve can be disposed in a system that varies the surrounding pressure based on whether the system is operational or switched off. When the system is switched off (i.e., not operating), the self-acting pressure drainage valve is normally biased in an open position such that fluid (e.g., water) can be expelled through a drainage passage of the valve. When, however, the system is operational (i.e., switched on) the increased pressure induces the valve into a closed position. Accordingly, and drainage passage is sealed such that air leakage through drainage passage is prevented. In this manner, the pressure within ECS is maintained and the overall efficiency is improved. Since the drainage passage can be selectively closed, the diameter of the drainage passage can be sized greater than conventional drill holes without causing undesirable flow losses.

Figure 1A:
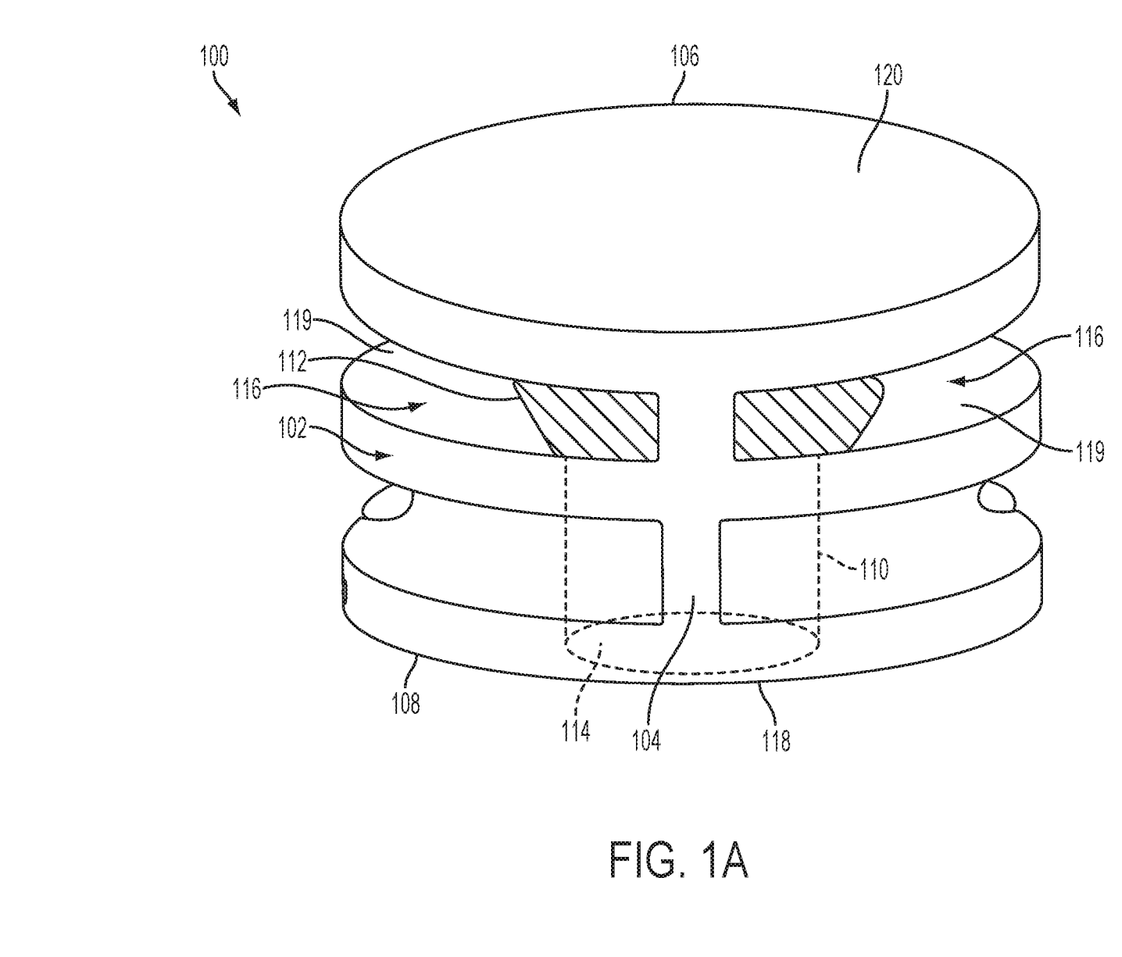
FIG. 1A is a perspective view of a self-acting pressure activated drain valve according to a non-limiting embodiment.

Referring now to FIG. 1A, a self-acting pressure drainage valve 100 (hereinafter referred to as a self-acting pressure valve 100) is illustrated according to a non-limiting embodiment. The self-acting pressure valve 100 includes a housing 102 having one or more outer walls 104 extending between an upper side 106 and a lower side 108. The housing 102 defines an inner cavity containing a drainage passage 110. The drainage passage 110 includes a first opening 112 and a second opening 114 disposed opposite the first opening 112. The outer wall 104 has one or more inlets 116 in fluid communication with the first opening 112, and the lower side 108 has at least one outlet 118 in fluid communication with the second opening 114. A rim 119 extends radially along a plane between the inlets 116 and the first opening 112. The rim 119 is configured to direct fluid along a flow path (i.e., the upper surface of the rim 119) that extends from each inlet 116 to the first opening 112. Thus, a plurality of flow paths is defined about the circumference of the rim 119. According to an embodiment, the drainage passage 110 extends perpendicular with respect to the flow paths (e.g., the rim 119). In this manner, the drainage passage 110 can be aligned parallel to the normal gravitational force such that fluid entering the first opening 112 falls downward through the drainage passage 110 and exits the self-acting pressure drainage valve 100 via the second opening 114.

Figure 1B:
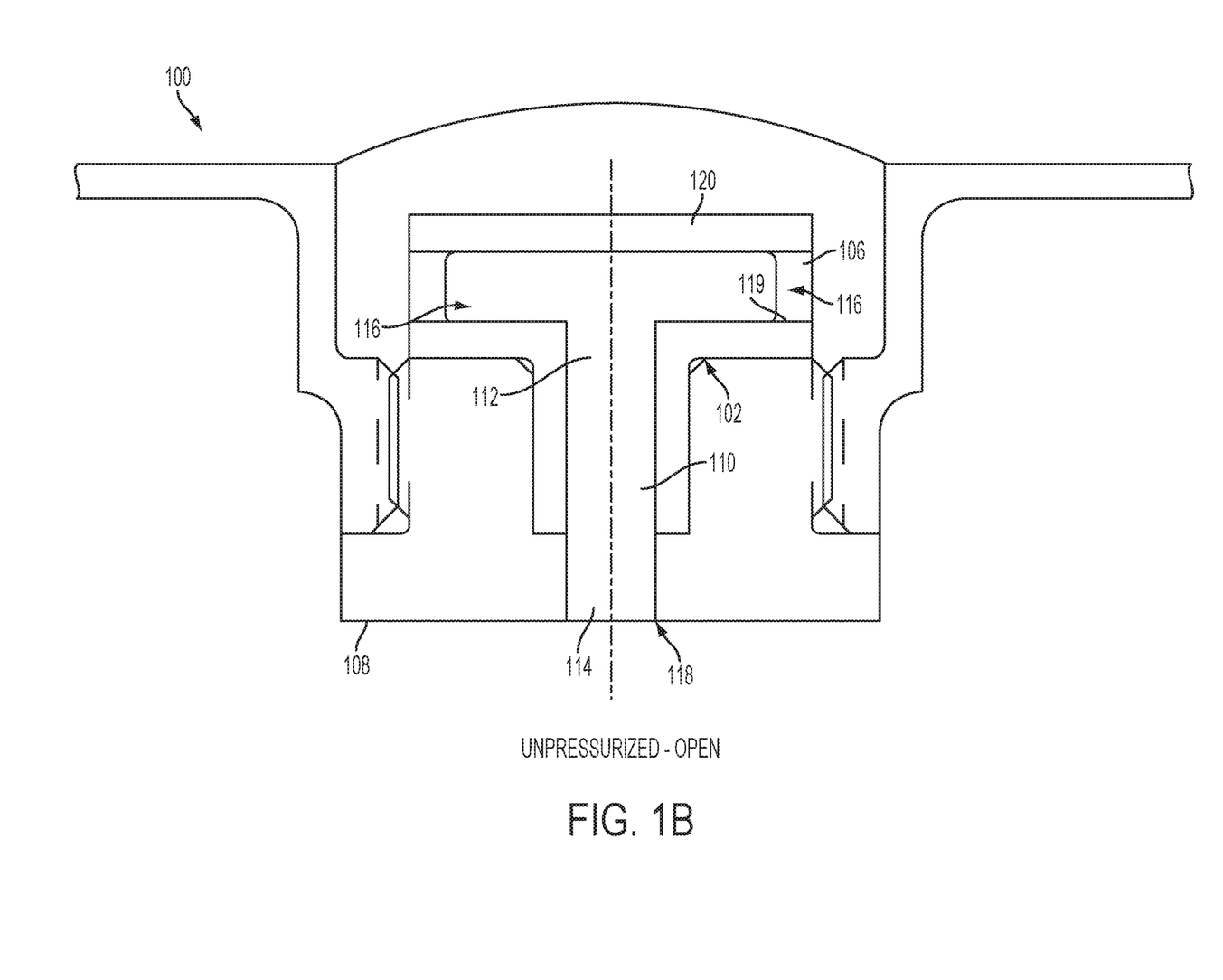
FIG. 1B is a cross-sectional view of the self-acting pressure activated drain valve shown in FIG. 1A operating in an open position.
Figure 1C:
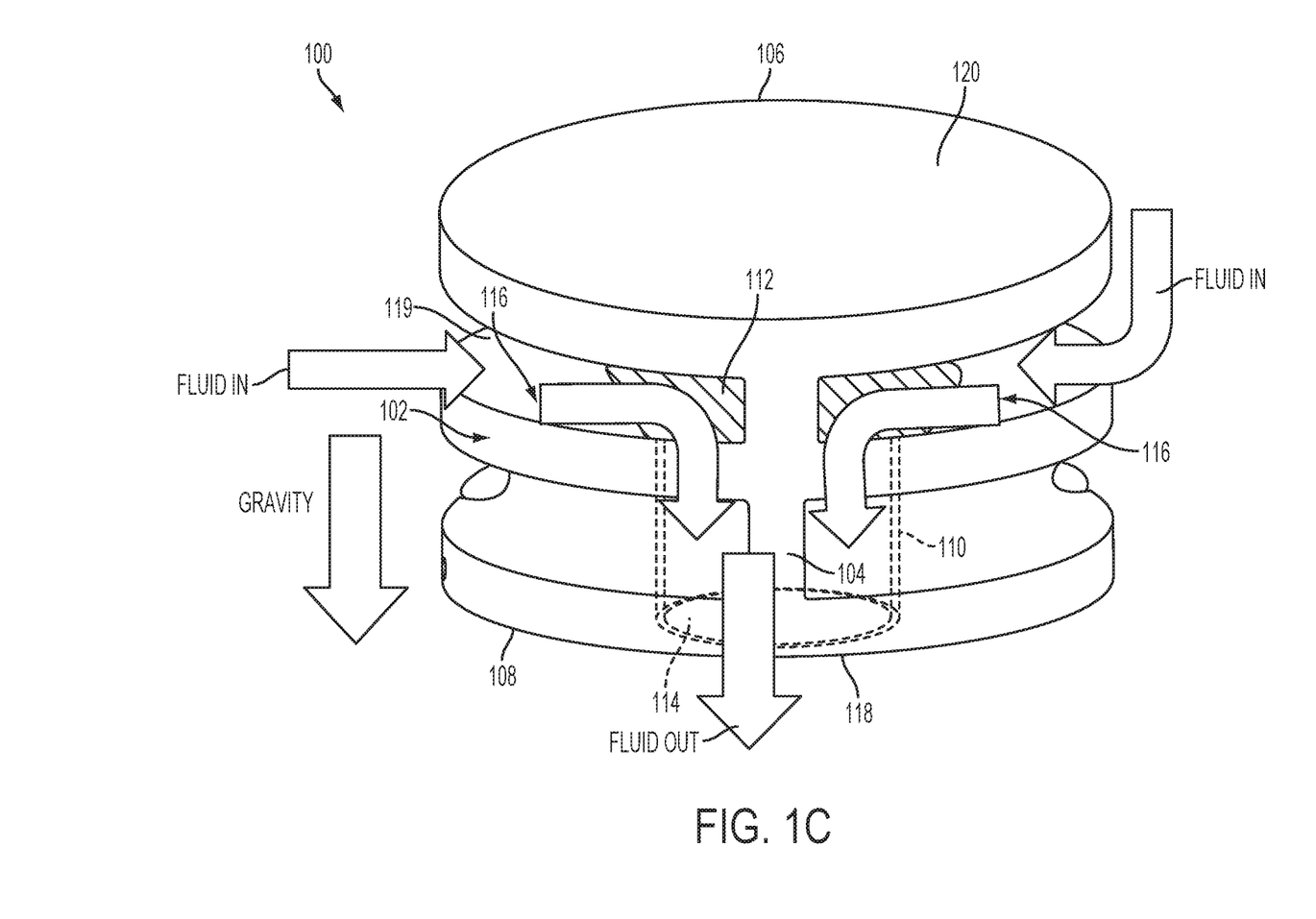
FIG. 1C illustrates fluid flowing through the self-acting pressure activated drain valve shown in FIGS. 1A-1B when operating in the open-position.

The self-acting pressure valve 100 further includes a flexible diaphragm 120 supported by the upper side 106. The diaphragm 120 comprises various elastomer materials including, but not limited to silicone. The material of the diaphragm 120 can also be selected according to a temperature operating range at the location of the valve. For example, at locations where temperatures are low (e.g., −20 degrees), the diaphragm 120 can comprise unreinforced silicone. A locations where temperatures are moderate (e.g., 300 degrees), the diaphragm 120 can comprise silicone reinforced with, for example, polyester. A locations where temperatures are high (e.g., 500 degrees), the diaphragm 120 can comprise silicone reinforced with an aramid polymer. According to a non-limiting embodiment, the diaphragm 120 is disposed above the drainage passage 110 such that a clearance is defined between the diaphragm 120 and the rim 119. The diaphragm 120 is biased in an open position when a first pressure surrounding the self-acting pressure valve 100 is less than or equal to a second pressure within the drainage passage 110. When operating in the open position, the first opening 112 is exposed to the inlets 116. Accordingly, fluid entering one or more of the inlets 116 is directed to the first opening 112, and in turn travels through the drainage passage 110 where it is expelled via the second opening 114 (see FIG. 1C).

Figure 2A:
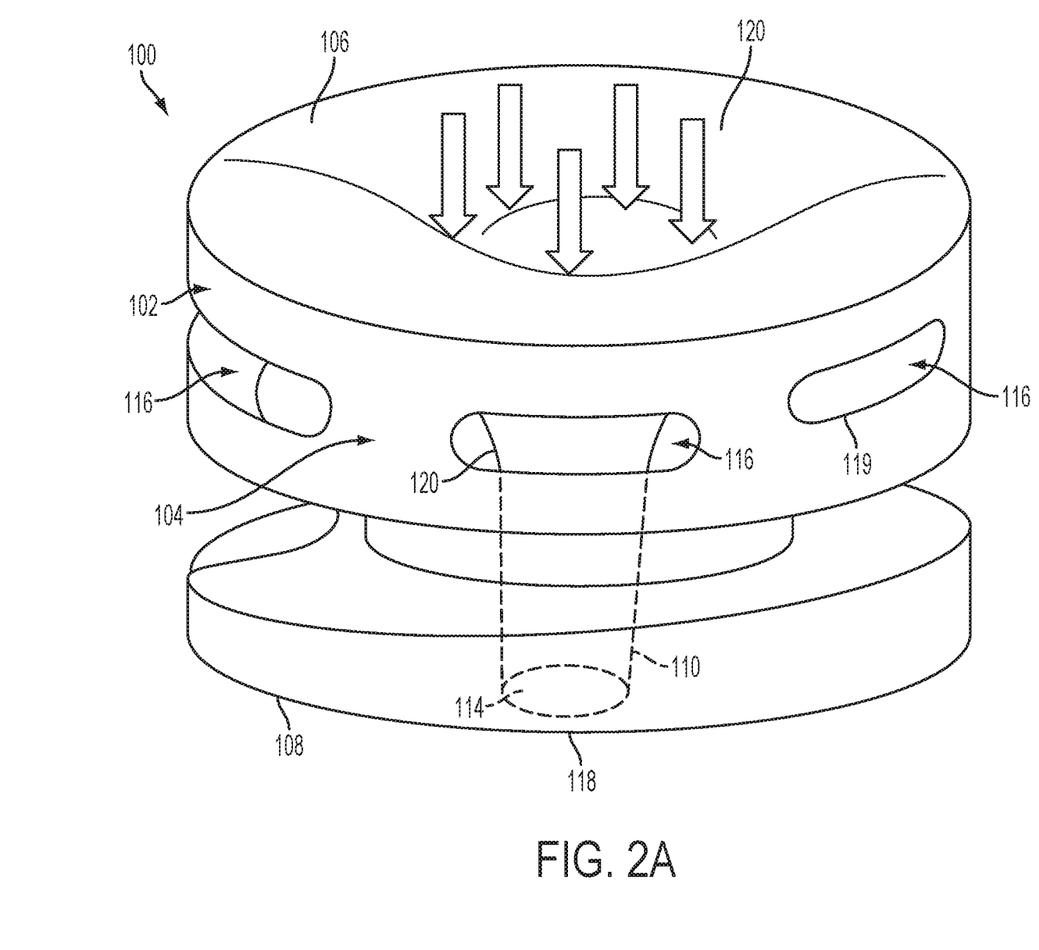
FIG. 2A illustrates a diaphragm of the self-acting pressure activated drain valve shown in FIG. 1A when operating in a closed position.
Figure 2B:
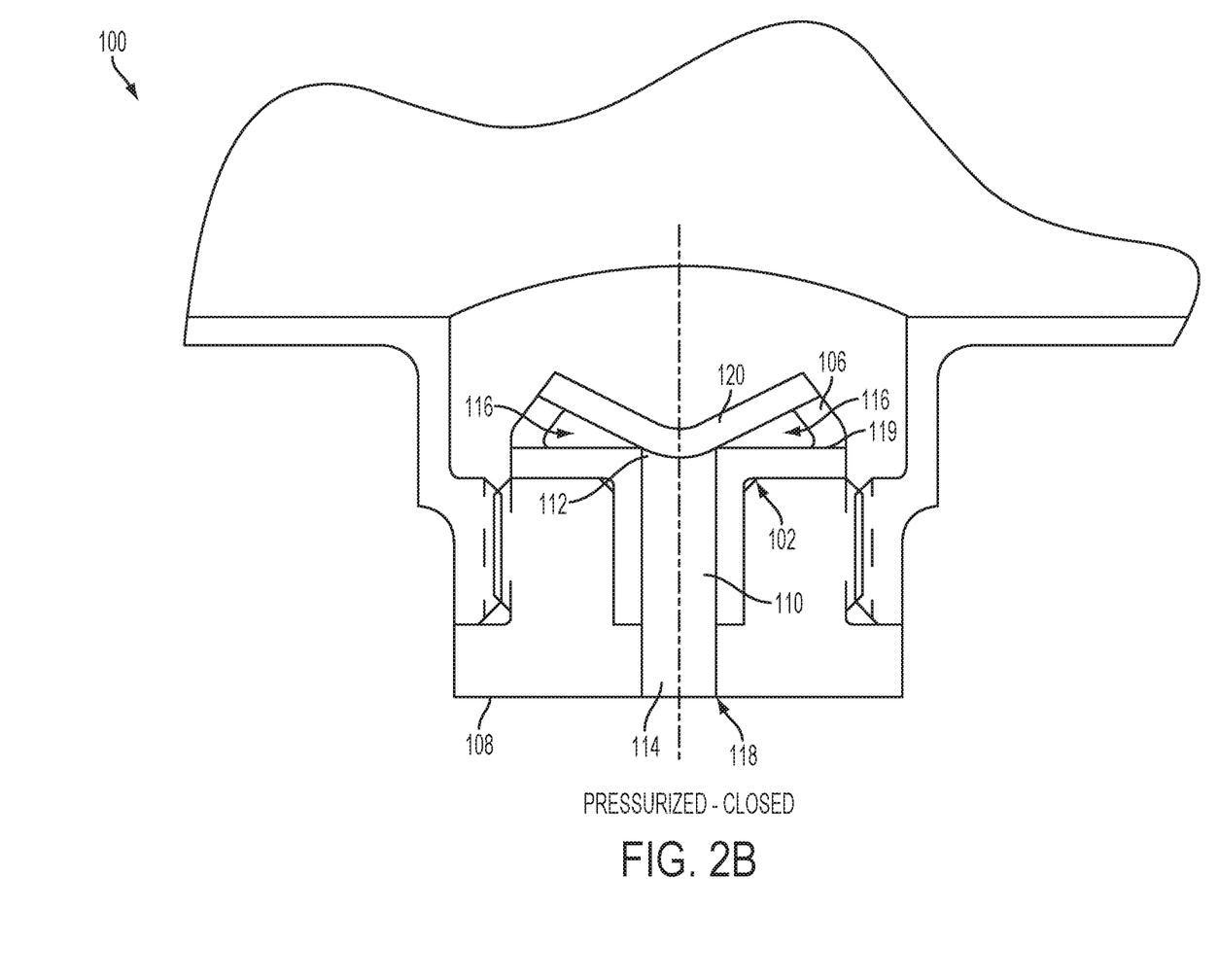
FIG. 2B is a cross-sectional view of the self-acting pressure activated drain valve shown in FIG. 2A.

Turning now to FIGS. 2A-2B, the self-acting pressure valve 100 is shown operating in a closed position. The closed position is self-induced in response to the first pressure surrounding the self-acting pressure valve 100 being greater than the second pressure within the drainage passage 110, which in turn collapses the diaphragm 120. That is, the self-acting pressure valve 100 induces the closed position based solely on a pressure differential without requiring any electronics and/or actuators. When the diaphragm 120 collapses, the first opening 112 is sealed, thereby preventing fluid (e.g., water, air, etc.) from entering the drainage passage 110. When the pressure differential returns to conditions where the first pressure surrounding the self-acting pressure activated drain valve 100 is less than or equal to a second pressure within the drainage passage 110, the diaphragm 120 returns to its normal biased open position such that the first opening 112 is unsealed and fluid can again flow into the drainage passage 110.

Figure 3A:
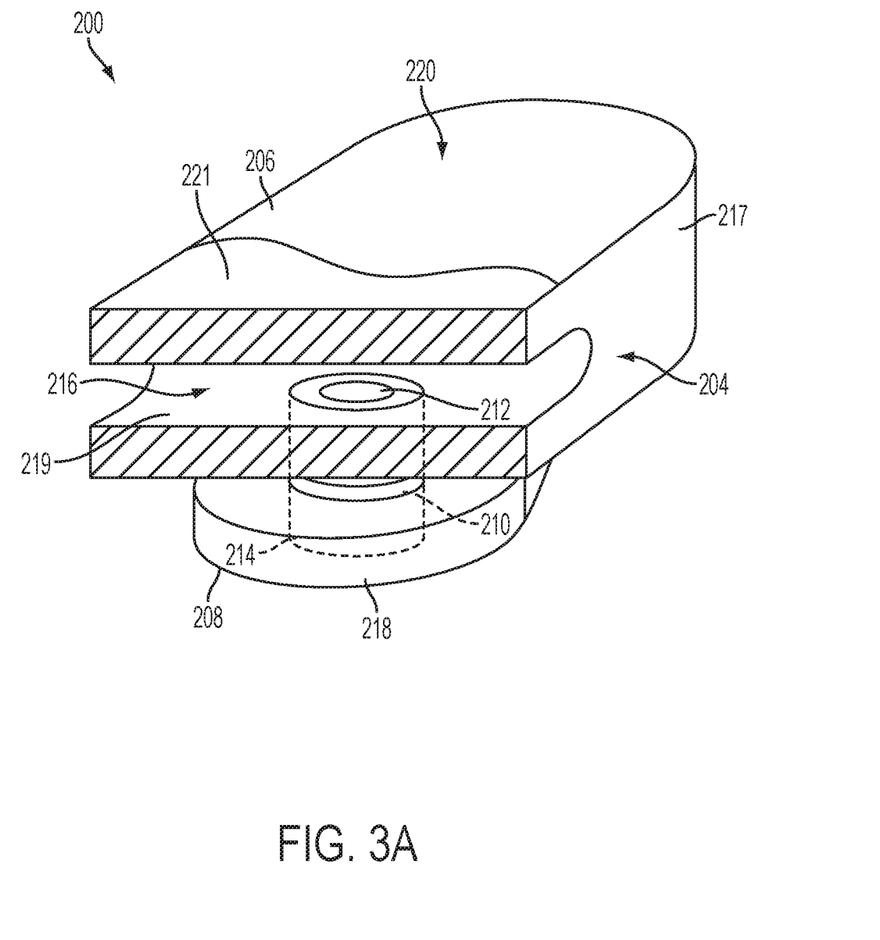
FIG. 3A is a perspective view of a self-acting pressure activated drain valve according to another non-limiting embodiment.
Figure 3B:
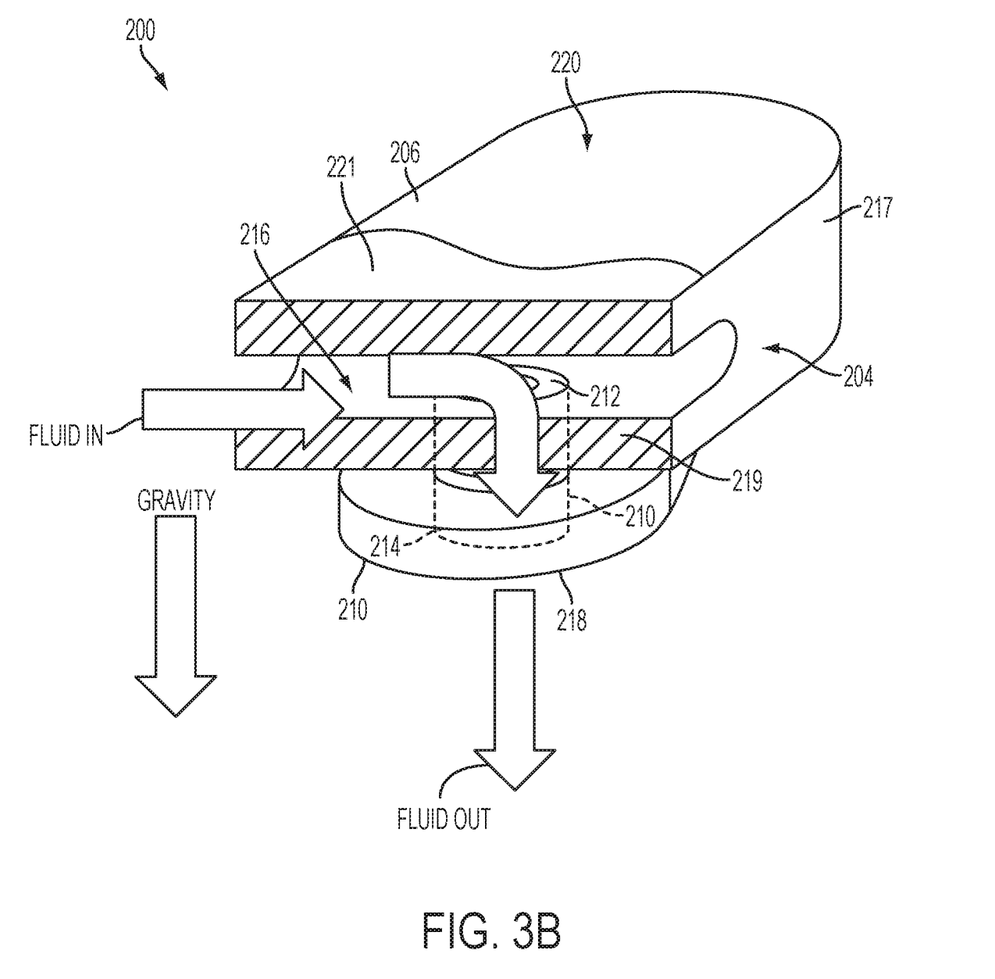
FIG. 3B illustrates fluid flowing through the self-acting pressure activated drain valve shown in FIG. 3A when operating in the open-position.

Turning now to FIGS. 3A-3B, a self-acting pressure activated drain valve 200 is illustrated according to another non-limiting embodiment. The self-acting pressure valve 200 includes a housing 202 having an outer wall 204 extending between an upper side 206 and a lower side 208. The housing 202 defines an inner cavity containing a drainage passage 210. The drainage passage 210 includes a first opening 212 and a second opening 214 disposed opposite the first opening 212. The outer wall 204 has one or more inlets 216 formed at a single side of the outer wall 204. The inlet 216 is in fluid communication with the first opening 212, and the lower side 208 has at least one outlet 218 in fluid communication with the second opening 214. A solid rear portion 217 is formed opposite the inlet 216. The solid rear portion 217 prevents fluid from flowing therethrough and re-directs fluid towards the first opening 212. Accordingly, the self-acting pressure activated drain valve 200 acts as a unidirectional drain valve. A rim 219 extends along a plane between the inlet 216 and the first opening 212. The rim 219 is configured to direct fluid along a single flow path that extends from the inlet 216 and the first opening 212. According to an embodiment, the drainage passage 210 extends perpendicular with respect to the flow path (e.g., the rim 219). In this manner, the drainage passage 210 can be aligned parallel to normal gravitational force such that fluid entering the first opening 212 falls downward through the drainage passage 210 and exits the self-acting pressure drainage valve 200 via the second opening 214.

The self-acting pressure valve 200 further includes a flexible diaphragm 220 supported by the upper side 206. According to an embodiment, the diaphragm 220 includes a flexible cantilever portion 221 configured to open and close based on a pressure differential realized by the self-acting pressure drainage valve 200. The diaphragm 220 comprises various elastomer materials including, but not limited to, silicone. According to a non-limiting embodiment, the diaphragm 220 is disposed above the drainage passage 210 such that a clearance is defined between the diaphragm 220 and the rim 219. The diaphragm 220 is biased in an open position when a first pressure surrounding the self-acting pressure valve 200 is less than or equal to a second pressure within the drainage passage 210. When operating in the open position, the first opening 212 is exposed to the first inlet 216. Accordingly, fluid entering the inlet 216 is directed to the first opening 212, and in turn travels through drainage passage 210 where it is expelled via the second opening 214 (see FIG. 3B).

Figure 3C:
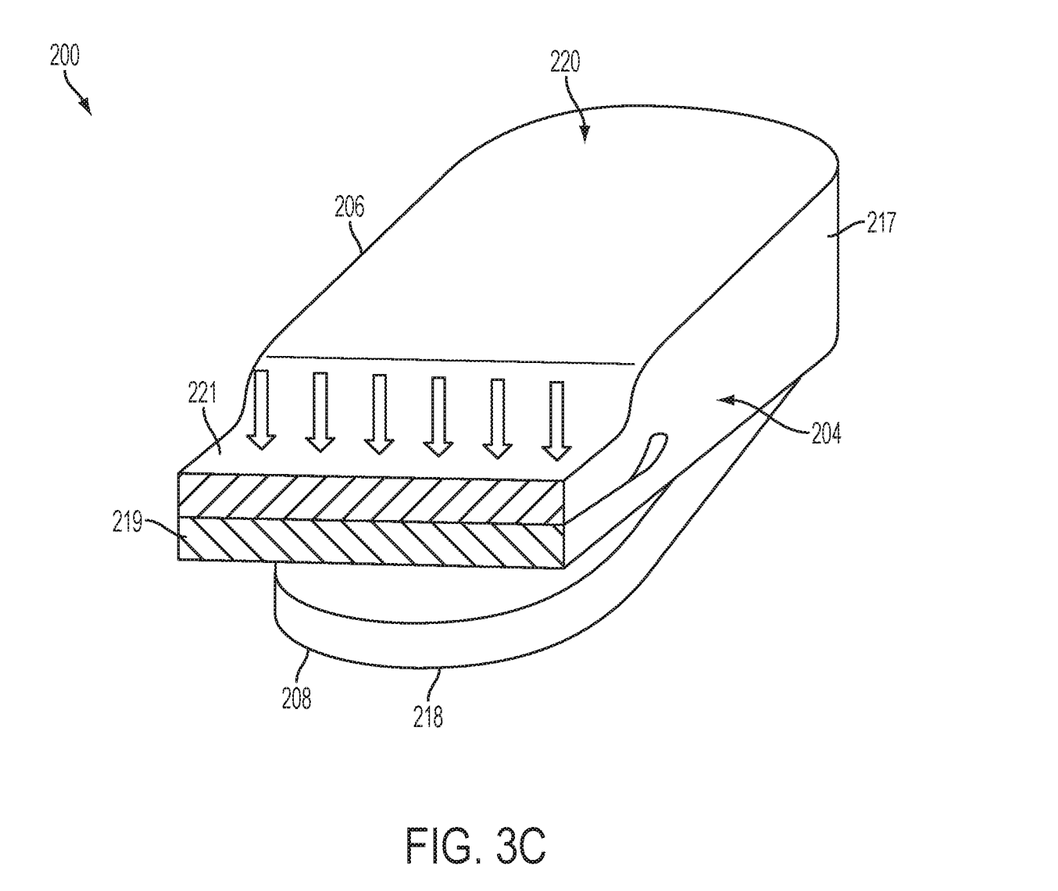
FIG. 3C illustrates a diaphragm of the self-acting pressure activated drain valve shown in FIGS. 3A-3C when operating in a closed position.

Turning now to FIG. 3C, the self-acting pressure drainage valve 200 is shown operating in a closed position. The closed position is self-induced in response to the first pressure surrounding the self-acting pressure valve 200 being greater than the second pressure within the drainage passage 210, which in turn collapses the cantilever portion 221 against the rim 219. That is, the self-acting pressure drainage valve 200 induces the closed position based solely on a pressure differential without requiring any electronics and/or actuators. When the cantilever portion 221 collapses, the inlet 216 is sealed, thereby preventing fluid (e.g., water, air, etc.) from entering the first opening 212. When the pressure differential returns to conditions where the first pressure surrounding the self-acting pressure activated drain valve 200 is less than or equal to a second pressure within the drainage passage 210, the cantilever portion 221 returns to its normal biased open position such that the inlet 216 is re-opened (i.e., unsealed) and fluid can flow into the first opening 212 and through the drainage passage 210.

Figure 4A:
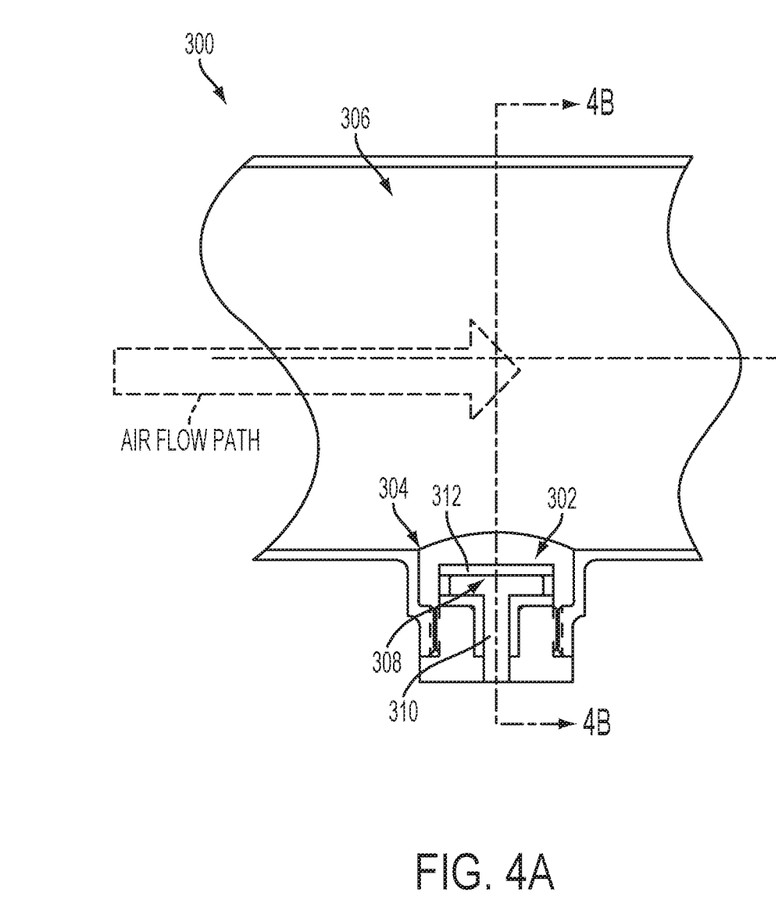
FIG. 4A is a first view of a self-acting pressure activated drain valve installed in an environmental control system according to a non-limiting embodiment.
Figure 4B:
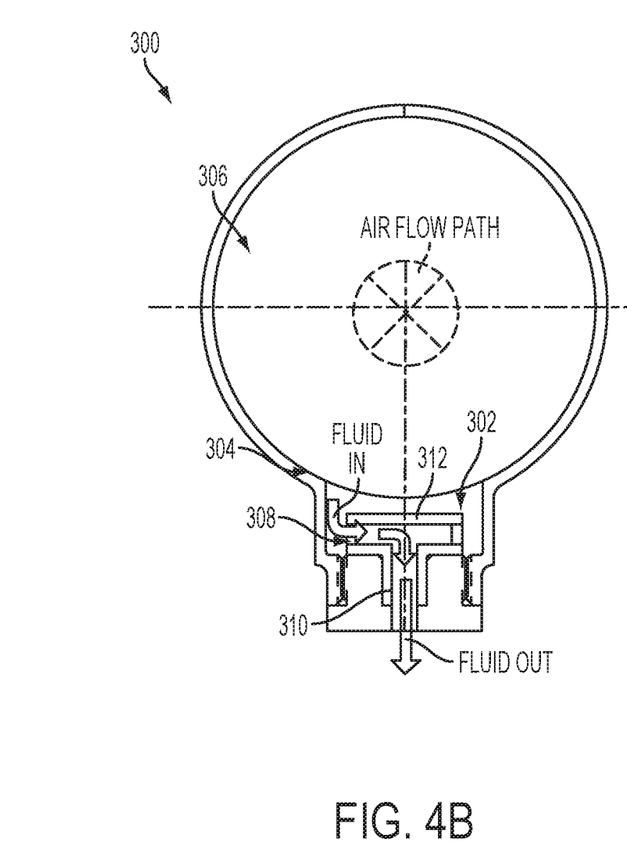
FIG. 4B is a second view of a self-acting pressure activated drain valve installed in an environmental control system taken along line A-A' showing a fluid flowing through a drainage passage when operating in the open position according to a non-limiting embodiment.

Turning to FIGS. 4A-4B, an ECS 300 including a self-acting pressure valve 302 installed at a drainage location 304 of a duct 306 is shown according to a non-limiting embodiment. Although the self-acting pressure valve 302 is shown as being installed in a duct 306, it should be appreciated that the self-acting pressure valve 302 may be installed at one or more other locations of the ECS including, but not limited to, headers, manifolds rotating components, or other locations known and/or anticipated to accumulate water. According to an embodiment, the self-acting pressure valve 302 is installed such that at least one inlet 308 is positioned transverse with respect to the air flow path at which air flows (e.g., through the duct 306) when the ECS 300 is operated (i.e., switched on).

Still referring to FIGS. 4A-4B, the ECS 300 is shown after recently being shut off. Accordingly, airflow stops flowing through the duct 306 along the flow path, thereby reducing the pressure surrounding the self-acting pressure valve 302. That is, when the ECS system is shut off, the pressure within the duct 306 reaches ambient pressure. As a result, a first pressure surrounding the self-acting pressure valve 302 becomes less than or equal to a second pressure within the drainage passage 310 such that the diaphragm 312 is biased in the open position and the inlet 308 (i.e., the drainage passage) is unsealed (i.e., open). As the temperature within the duct 306 decreases over time, water vapor contained in the air within the duct 306 condenses causing fluid (e.g. water) to accumulate at the drainage location 304. The accumulated water is collected by the inlet 308 and directed to the drainage passage 310, where it is expelled (i.e., drained) from the duct 306.

When the ECS 300 is returned to operation (not shown in FIGS. 4A-4B), air flowing through the duct 306 causes the first pressure surrounding the self-acting pressure activated drain valve 302 to be greater than the second pressure within the drainage passage 310. Accordingly, the diaphragm 312 is self-induced into the closed position and the inlet 308 (i.e., the drainage passage) is sealed (i.e., closed) as described in detail above. Since the drainage passage 310 is sealed, air leakage through the drainage path 310 is prevented thereby maintaining the pressure within the duct 306. In this manner, the overall efficiency of the ECS 300 is improved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A self-acting pressure activated drain valve, comprising: at least one inlet configured to receive a fluid; at least one outlet configured to expel the fluid; a drainage passage including a first opening in fluid communication with the at least one inlet and a second opening in fluid communication with the at least one outlet, the drainage passage being perpendicular with respect to the at least one inlet; a housing that includes opposing side walls extending from the at least one inlet to a solid rear portion opposite the at least one inlet, the housing defining an inner cavity surrounded by the opposing side walls and the solid rear portion, the inner cavity containing the first opening; and a flexible diaphragm coupled to the housing via the opposing side walls, the flexible diaphragm including a flexible cantilever at a front portion of the housing, the flexible cantilever configured to collapse with respect to the solid rear portion to operate in an open position and a closed position based on a pressure, wherein the flexible diaphragm is normally biased in the open position such that fluid is delivered from the at least one inlet to the at least one outlet via the drainage passage, wherein the flexible cantilever collapses into the at least one inlet and in front of the inner cavity without collapsing the solid rear portion to seal the first opening and block the drainage passage when operating in the closed position.

2. The self-acting pressure activated drain valve of claim 1, wherein the diaphragm is configured to remain in the biased open position when a first pressure surrounding the self-acting pressure activated drain valve is less than or equal to a second pressure within the drainage passage, and is configured to collapse in response to the first pressure being greater than the second pressure.

3. The self-acting pressure activated drain valve of claim 1, wherein the diaphragm comprises an elastomer material.

4. The self-acting pressure activated drain valve of claim 1, wherein the solid rear portion prevents the fluid from flowing therethrough and redirects the fluid toward the first opening.

5. A method of draining fluid using a self-acting pressure activated drain valve, the method comprising:
disposing a flexible diaphragm between opposing side walls of a housing and coupled to an upper side of the housing located above a drainage passage, the flexible diaphragm having a front portion that collapses with respect to a solid rear portion configured to prevent fluid from flowing therethrough and to re-direct the fluid towards the drainage passage;
interposing at least one inlet of the self-acting pressure activated drain valve between a flow path of the fluid and the drainage passage such that the drainage passage is perpendicular with respect to the at least one inlet and the flow path;
biasing the flexible diaphragm in an open position when a first pressure surrounding the self-acting pressure activated drain valve is less than or equal to a second pressure within the drainage passage such that the fluid is delivered through the drainage passage; and
collapsing a flexible cantilever at the front portion of the flexible diaphragm into a closed position without collapsing the solid rear portion to seal the first opening and block the drainage passage in response to the first pressure being greater than the second pressure,
wherein the solid rear portion prevents the fluid from flowing therethrough and redirects the fluid toward a first opening of the drainage passage.

6. The method of claim 5, wherein the diaphragm blocks airflow through the drainage passage when collapsed in the closed position.

7. The method of claim 6, wherein the diaphragm comprises an elastomer material.

* * * * *